United States Patent
Chang et al.

(10) Patent No.: US 8,714,751 B2
(45) Date of Patent: May 6, 2014

(54) VISIBLE AND INFRARED LIGHT SOURCE FOR ILLUMINATION SYSTEM AND PROJECTION DEVICE COMPRISING THE SAME

(75) Inventors: Keh-Su Chang, Taoyuan Hsien (TW); Fu-Kuo Sun, Taoyuan Hsien (TW)

(73) Assignee: Delta Electronics, Inc., Taoyuan Hsien (TW)

( * ) Notice: Subject to any disclaimer, the term of this patent is extended or adjusted under 35 U.S.C. 154(b) by 334 days.

(21) Appl. No.: 13/206,594

(22) Filed: Aug. 10, 2011

(65) Prior Publication Data

US 2012/0044461 A1    Feb. 23, 2012

(30) Foreign Application Priority Data

Aug. 20, 2010    (TW) ................. 99127914 A

(51) Int. Cl.
  *G03B 21/20* (2006.01)
  *G03B 21/26* (2006.01)
  *G09B 19/16* (2006.01)
(52) U.S. Cl.
  USPC ............... 353/85; 353/94; 434/41; 434/44
(58) Field of Classification Search
  USPC ........ 353/30–31, 33, 85, 94, 122; 434/20–21, 434/36–38, 41–44; 359/885, 889; 348/33, 348/742–743, 750, 754, 758; 362/84
  See application file for complete search history.

(56) References Cited

U.S. PATENT DOCUMENTS

| | | | | |
|---|---|---|---|---|
| 4,948,957 A | * | 8/1990 | Rusche | 250/330 |
| 6,196,845 B1 | * | 3/2001 | Streid | 434/44 |
| 6,747,711 B2 | * | 6/2004 | Marshall | 349/15 |
| 6,811,267 B1 | * | 11/2004 | Allen et al. | 353/122 |
| 7,201,483 B2 | * | 4/2007 | Chung et al. | 353/94 |
| 7,293,880 B2 | | 11/2007 | Sakata et al. | |
| 7,391,475 B2 | * | 6/2008 | Pate et al. | 348/602 |
| 7,452,082 B2 | | 11/2008 | Sun et al. | |

(Continued)

FOREIGN PATENT DOCUMENTS

| | | |
|---|---|---|
| CN | 1885095 | 12/2006 |
| CN | 101840089 | 9/2010 |

(Continued)

OTHER PUBLICATIONS

English translation of an Office Action issued in corresponding Chinese Appln. No. 201010274912.X dated Jan. 31, 2013.

(Continued)

*Primary Examiner* — Tony Ko
*Assistant Examiner* — Jori S Reilly-Diakun
(74) *Attorney, Agent, or Firm* — Grossman, Tucker, Perreault & Pfleger, PLLC

(57) ABSTRACT

An illumination system and a projection device comprising the same are provided. The projection device comprises an image-forming system and the illumination system. The illumination system comprises a first light source device, a second light source device and a first light guiding device. The first light source device generates a visible light, while the second light source device directly generates a substantially pure infrared light. The first light guiding device is adapted to guide the visible light and the infrared light to the image-forming system for processing to make the visible light form a visible light image and make the infrared light form an infrared light image.

16 Claims, 5 Drawing Sheets

(56) References Cited

U.S. PATENT DOCUMENTS

| | | | |
|---|---|---|---|
| 7,663,795 B2* | 2/2010 | Blackham | 359/237 |
| 8,016,425 B2* | 9/2011 | Ito | 353/31 |
| 8,282,222 B2* | 10/2012 | Smits | 353/85 |
| 8,339,373 B2 | 12/2012 | Chang | |
| 8,348,440 B2* | 1/2013 | Burggraf et al. | 353/122 |
| 2005/0017204 A1 | 1/2005 | Satou | |
| 2006/0232395 A1 | 10/2006 | Tatsukawa | |
| 2007/0165185 A1 | 7/2007 | Chen | |
| 2008/0174742 A1 | 7/2008 | Ito | |
| 2009/0109409 A1* | 4/2009 | Haraguchi et al. | 353/85 |
| 2009/0207380 A1* | 8/2009 | Aruga | 353/20 |

FOREIGN PATENT DOCUMENTS

| | | |
|---|---|---|
| JP | 2006-162658 | 6/2006 |
| TW | 200728768 | 8/2007 |
| TW | M352055 | 3/2009 |
| TW | I311205 | 6/2009 |
| TW | I315396 | 10/2009 |

OTHER PUBLICATIONS

English translation of an Office Action issued in corresponding Taiwanese Appln. No. 099131419 dated Apr. 15, 2013.

English translation of an Office Action issued in corresponding Taiwanese Appln. No. 099131419 dated Oct. 18, 2013.

* cited by examiner

VISIBLE AND INFRARED LIGHT SOURCE FOR ILLUMINATION SYSTEM AND PROJECTION DEVICE COMPRISING THE SAME

This application claims priority to Taiwan Patent Application No. 099127914 filed Aug. 20, 2010, the disclosures of which are incorporated herein by reference in their entirety.

CROSS-REFERENCES TO RELATED APPLICATIONS

Not applicable.

BACKGROUND OF THE INVENTION

1. Field of the Invention

The present invention relates to an illumination system for a projection device, and more particularly, to an illumination system for a projection device adapted to generate a visible light image and an infrared light image.

2. Descriptions of the Related Art

Human eyes can only see the visible light with wavelength ranging from approximately 400 nm to 700 nm. However, at night or when the visible light becomes faint, light (e.g., moonlight or starlight) irradiated from the objects in the natural environment has wavelength mainly ranging from approximately 700 nm to 1,000 nm, so human eyes cannot see the objects in such environment. In particular, it is critical for military operations to see clearly the targets at night. Therefore, in military and civil aviation applications, simulation at night with a training simulator is one of the primary training programs for aviation training. A common night vision goggle (NVG) can convert the light with wavelength between 650 nm and 880 nm (mainly an infrared light) into a visible light with wavelength between 400 nm and 700 nm. In most cases, human eyes preferably receive visible light with wavelength of about 550 nm that is converted by the NVG.

In reference to FIGS. 1A and 1B, a conventional night vision projector 1 can generate a visible light image and an infrared light image. In reference to FIG. 1A, during the simulation of a visible light image, by turning on a light source 11 and turning off a light source 12, a light ray 11a generated by the light source 11 passes through a visible light filter 112, is then reflected by reflectors 131, 133 to a light processing element 14 to be processed into a visible light image, and is finally projected outward via a lens 15. In reference to FIG. 1B, during the simulation of a night vision image, by turning off the light source 11 and turning on the light source 12, a light ray 12a generated by the light source 12 is filtered by an infrared light filter 122 into an infrared light, is then reflected by reflectors 132, 134 to the light processing element 14 to be processed into an infrared light image, and is finally projected outward, also via the lens 15, to present an infrared light image. At this point, the user observes the infrared light image by using the NVG to simulate conditions at night. However, both the light ray 11a and the light ray 12a emitted by the light sources 11, 12 have to be filtered through the visible light filter 112 and the infrared light filter 122 and then be reflected by the reflectors 131, 132, 133, 134 multiple times respectively to form the visible light image and the infrared light image respectively; therefore, the light ray 11a and the light ray 12a are continuously attenuated during the filtering process and the multiple reflections described above, which affects the luminance of the generated images. Furthermore, the visible light filter 112 and the infrared light filter 122 will absorb a great deal of light energy that is filtered out and thus, generates a great deal of heat energy, resulting in many problems. On the other hand, the night vision projector 1 of this kind usually has disadvantages, such as a bulky volume due to the numerous elements therein.

FIG. 2 illustrates another conventional night vision simulation system 2. A tracking element 24 tracks the viewing direction of a night vision goggle 21, an image generator 23 controls a display 22 to generate a corresponding red light image for output to the night vision goggle 21 according to the viewing direction of the night vision goggle 21. In this way, although the user can experience the image that is saw when a night vision goggle is used, this simulator requires complicated and precise parts and fails to allow multiple persons to see the same infrared light image at the same time, which reduces their the feeling of presence of drilling at night. On the other hand, conventional night vision simulation system 2 cannot provide a visible light image; and when a visible light image is to be provided for use in daylight, another auxiliary apparatus is required.

In view of this, a need exists in the art to provide an illumination system for a projection device, which can provide both a common visible light image and an infrared light image for simulating conditions at night without the need of complicated parts and apparatuses and also, can increase the luminance and the light utilization efficiency and reduce the generation of heat energy.

SUMMARY OF THE INVENTION

The primary objective of the present invention is to provide a projection device capable of providing both a visible light image and an infrared light image and an illumination system thereof, which have advantages as a high luminance, a high light utilization efficiency and low generation of heat energy.

To achieve the aforesaid objective, a projection device of the present invention comprises an image-forming system and an illumination system. The illumination system comprises a first light source device, a second light source device and a first light guiding device. The first light source device generates a visible light, while the second light source device directly generates a substantially pure infrared light. The first light guiding device guides the visible light and the infrared light to the image-forming system for processing to make the visible light form a visible light image and make the infrared light form an infrared light image.

The detailed technology and preferred embodiments implemented for the subject invention are described in the following paragraphs accompanying the appended drawings for people skilled in this field to well appreciate the features of the claimed invention.

DESCRIPTION OF THE PREFERRED EMBODIMENT

Figure 1A:
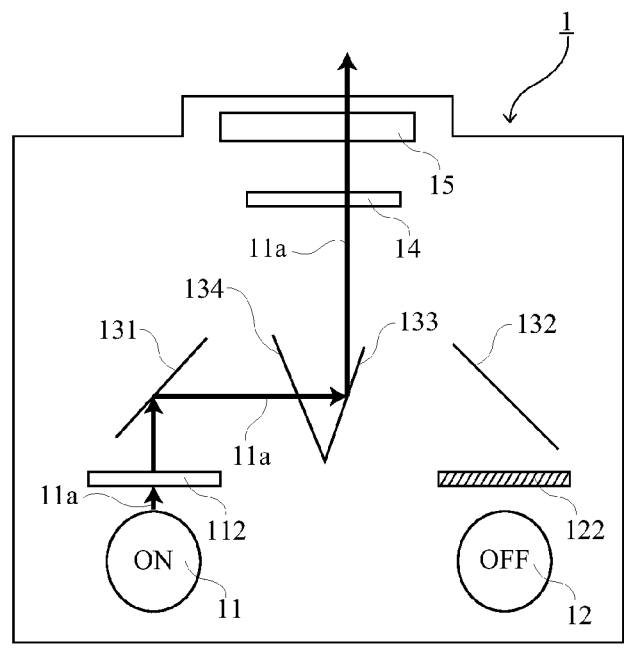
FIG. 1A is a schematic view of a conventional night vision projector simulating a visible light image.
Figure 1B:
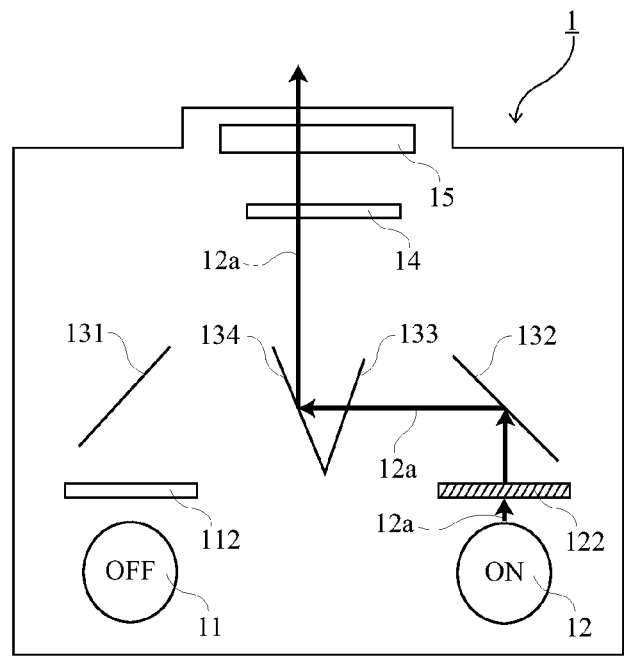
FIG. 1B is a schematic view of the conventional night vision projector simulating an infrared light image.
Figure 2:
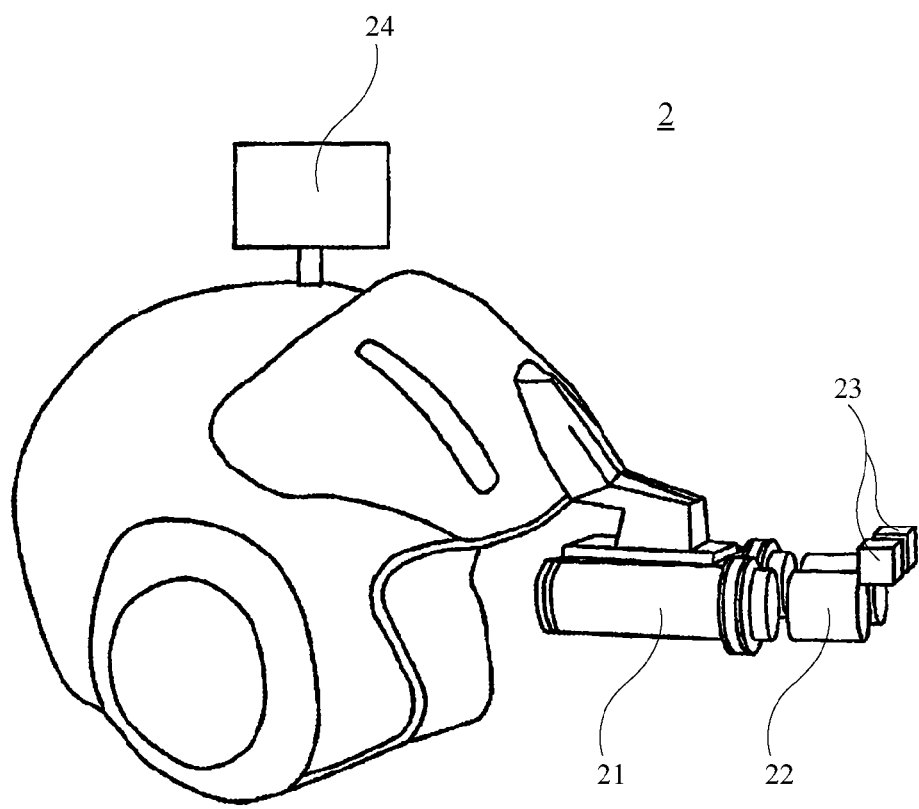
FIG. 2 is a schematic view of a conventional night vision simulation system.
Figure 3A:
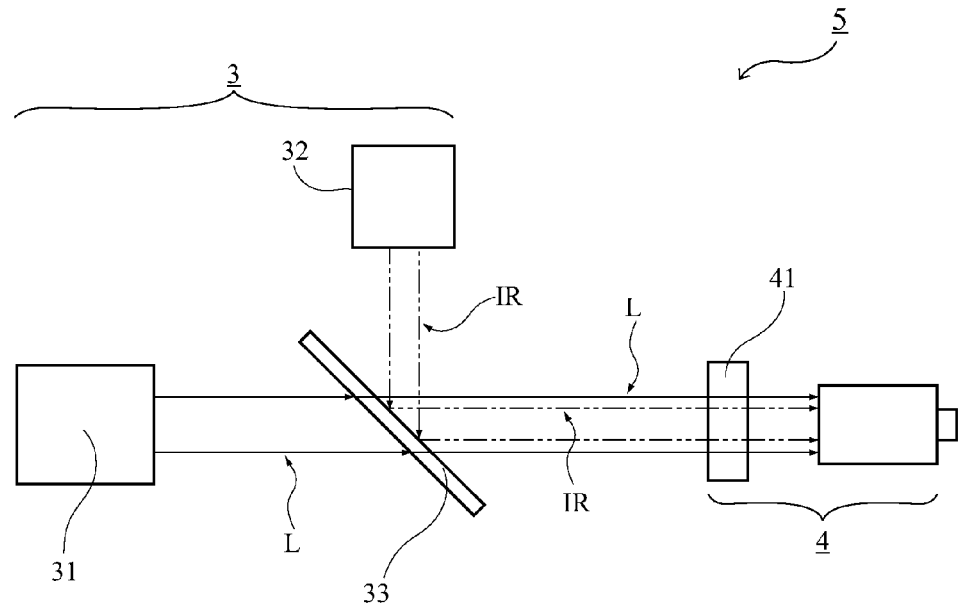
FIG. 3A is a schematic view of the first embodiment of the present invention.

Firstly, in reference to FIG. 3A, the projection device 5 of the present invention comprises an image-forming system 4 and an illumination system 3. The illumination system 3 comprises a first light source device 31, a second light source device 32 and a first light guiding device 33. The first light source device 31 is adapted to generate a visible light L, while the second light source device 32 is an infrared light source. The second light source device 32 directly generates a substantially pure infrared light IR without using an infrared light filter or adopting other indirect ways. The first light guiding device 33 is adapted to guide the visible light L and the infrared light IR to the image-forming system 4 for processing so that the visible light L forms a visible light image and the infrared light IR forms an infrared light image.

The second light source device 32 directly generates the substantially pure infrared light, which has wavelength ranging from 650 nm to 880 nm. This wavelength range conforms to the spectral response of a night vision goggle, so the infrared light can be saw through the night vision goggle to simulate conditions at night. Furthermore, the first light guiding device 33 comprises a dichroic layer, which allows the visible light L to pass therethrough, but reflects the infrared light IR to the image-forming system 4.

In the present invention, the image-forming system 4 comprises a light processing element 41 for making the visible light L and the infrared light IR form a visible light image and an infrared light image respectively. The light processing element 41 may be a liquid crystal display (LCD) element, a digital micromirror device (DMD), or a liquid crystal on silicon (LCOS) element. Moreover, the projection device 5 of the present invention may be an apparatus with projection and displaying functions such as a digital light processing (DLP) projection device or a liquid crystal display (LCD) projection device.

For convenience of description, the preferred embodiments of the present invention will be explained in detail hereinafter. It shall be appreciated that the preferred embodiments of the present invention are not intended to limit the present invention to any specific environment, applications or particular implementations described in the preferred embodiments. Therefore, the description of the preferred embodiments is only for the purpose of illustration rather than to limit the present invention.

Figure 3B:
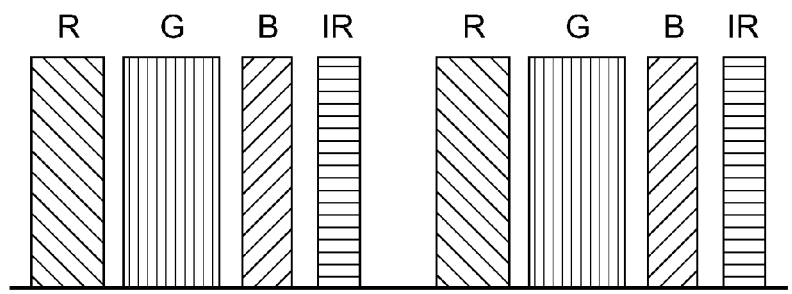
FIG. 3B is a schematic view showing the output of light rays of different wave bands according to the time sequence according to the first embodiment of the present invention.

The first embodiment of the present invention is shown in FIG. 3A and FIG. 3B. As shown in FIG. 3B, the first light source device 31 and the second light source device 32 emit a red light R, a green light G, a blue light B and an infrared light IR respectively by time sequence control. In reference to FIG. 3A, after being emitted by the first light source device 31 according to the time sequence, the red light R, the green light G and the blue light B pass through the first light guiding device 33 and are outputted to the light processing element 41 of the image-forming system 4 for processing. The red light R, the green light G and the blue light B are processed into a red light image, a green light image and a blue light image respectively by the light processing element 41, and are projected outward to form a visible light image through superposition. Then, subsequent to the first light source device 31, the second light source device 32 emits the infrared light IR. The infrared light IR is reflected and guided by the dichroic layer of the first light guiding device 33 to the image-forming system 4, where it is processed into an infrared light image by the light processing element 41 for projection outward.

The first light source device 31 preferably comprises a red light emitting diode, a green light emitting diode and a blue light emitting diode, which emit the red light R, the green light G and the blue light B respectively by a time sequence control; and the second light source device 32 may be an infrared light emitting diode which directly emits the substantially pure infrared light IR. Alternatively, the first light source device 31 comprises a red laser light source, a green laser light source and a blue laser light source, which emit the red light R, the green light G and the blue light B respectively by a time sequence control; and the second light source device 32 may be an infrared laser light source which directly emits the substantially pure infrared light IR.

In addition, it shall be appreciated that in other variants, the first light source device 31 may comprise a combination of the aforesaid laser light sources and light emitting diodes, for example, a combination of the red laser light source, the green light emitting diode and the blue light emitting diode. Furthermore, the green light G may also be generated through excitation of a green phosphor (not shown) by the blue laser light source or the blue light emitting diode. Likewise, the infrared light IR may also be emitted by a combination of the infrared light emitting diode and the infrared laser light source.

It can be readily inferred by those of ordinary skill in the art that the aforesaid first light guiding device 33 of this embodiment may have a dichroic layer with opposite characteristics and the position of the first light source device 31 may be exchanged with that of the second light source device 32. In this case, the first light guiding device 33 can also reflect the visible light L generated by the first light source device 31 to the image-forming system 4, and allow the infrared light IR generated by the second light source device 32 to pass therethrough to the image-forming system 4, thereby generating and projecting the visible light image and the infrared light image.

Figure 4A:
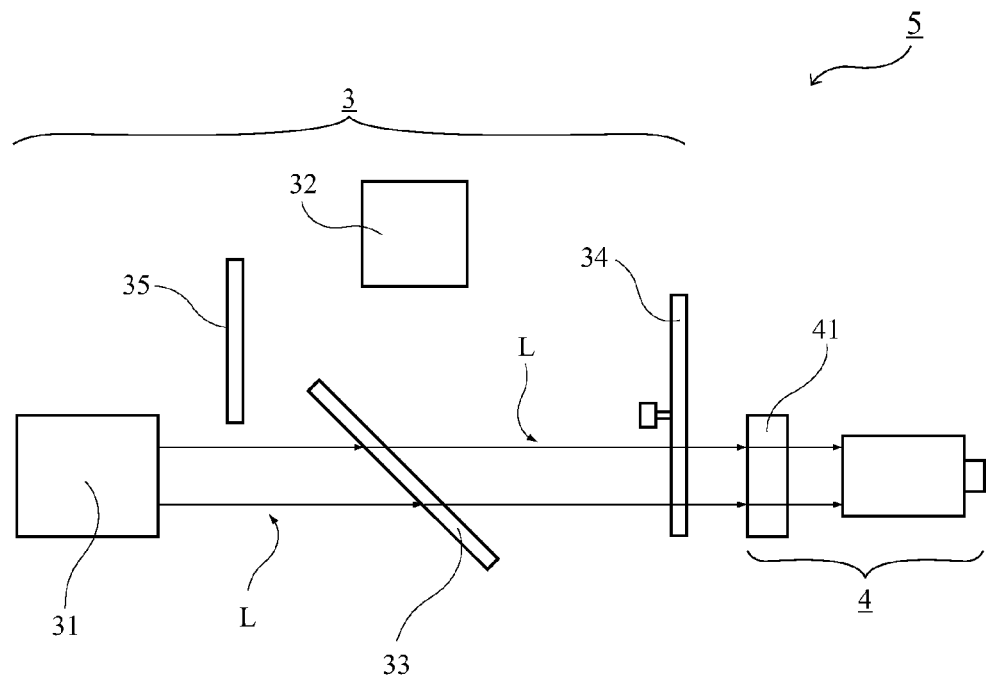
FIG. 4A is a schematic view the output of a visible light image according to the second embodiment of the present invention.
Figure 4B:
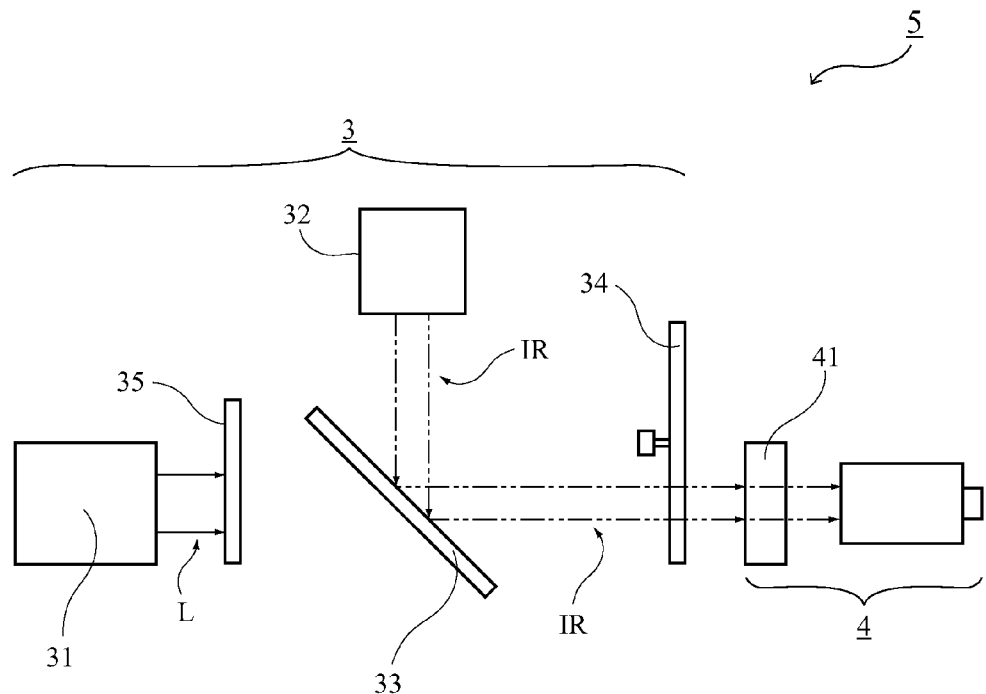
FIG. 4B is a schematic view showing the output of an infrared light image according to the second embodiment of the present invention.

The second embodiment of the present invention is shown in FIG. 4A and FIG. 4B. The second embodiment of the present invention differs from the first embodiment in that the first light source device 31 is a white light source and the illumination system 3 further comprises a color wheel 34 and a switch device 35. By controlling the color wheel 34 according to the time sequence, the visible light L from the first light source device 31 is filtered into the red light R, the green light G and the blue light B respectively according to the time sequence when passing through the color wheel 34.

In this embodiment, the first light source device 31 may be a white light emitting diode, a high intensity discharge (HID) lamp or an ultra high pressure (UHP) lamp. The second light source device 32 may be an infrared light emitting diode (LED) or an infrared laser light source.

In reference to FIG. 4A, the first light source device 31 of this preferred embodiment is a white light source, so the color wheel 34 must be disposed between the first light guiding device 33 and the image-forming system 4. The color wheel 34, which comprises a red sector, a green sector, a blue sector and a transparent sector, can filter the visible light L of the first light source device 31 into a red light R, a green light G and a blue light B respectively by a time sequence control and allow the infrared light IR of the second light source device 32 to pass through the transparent sector. The switch device 35 is disposed between the first light source device 31 and the first light guiding device 33 to control the visible light L entering the first light guiding device 33. The first light guiding device 33 is adapted to guide and output the visible light L and the infrared light IR to the light processing element 41 of the image-forming system 4 for processing so that the visible light L forms the visible light image and the infrared light IR forms the infrared light image. This process will be described in more detail hereinafter.

In reference to FIG. 4A, the first light source device 31 continuously emits the visible light L; and when the switch device 35 is far away from the first light source device 31, the switch device 35 allows the visible light L from the first light source device 31 to enter the first light guiding device 33. In this case, the second light source device 32 is turned off. After the visible light L passes through the first light guiding device 33, the color wheel 34 is sequentially rotated to the red sector, the green sector and the blue sector by a time sequence control so that the visible light L is filtered into the red light R, the green light G and the blue light B respectively by the color wheel 34. Finally, the red light R, the green light G and the blue light B are outputted to the image-forming system 4 where they are processed by the light processing element 41 into the red light image, the green light image and the blue light image respectively, and are then projected outward to form the visible light image through superposition.

In reference to FIG. 4B, when the color wheel 34 is rotated to the transparent sector, the switch device 35 is located in front of the first light source device 31 to prevent the visible light L from entering the first light guiding device 33, thereby preventing the visible light L from entering the image-forming system 4 and the light processing element 41. In this case, the second light source device 32 is turned on, and directly emits the substantially pure infrared light IR to the first light guiding device 33. The first light guiding device 33 reflects the infrared light IR to the color wheel 34. At this point, the color wheel 34 is controlled according to the time sequence to allow the infrared light IR to pass through the transparent sector of the color wheel 34 and to be outputted to the light processing element 41 of the image-forming system 4 for processing, thereby forming the infrared light image.

It shall be noted that if the first light source device 31 of the second embodiment adopts a white light emitting diode, then the illumination system 3 of this embodiment may not comprise the switch device 35, in which case it is only necessary to, when the color wheel 34 is controlled according to the time sequence, to allow the infrared light IR to pass through the transparent sector of the color wheel 34, and turn off the white light emitting diode of the first light source device 31 so that it does not emit the visible light L. Furthermore, similar to the first embodiment, variants of the first light source device 31 and the second light source device 32 can be readily inferred by those of ordinary skill in the art. Similar to the first embodiment, in the second embodiment, the first light guiding device 33 may also have a dichroic layer with opposite characteristics and the position of the first light source device 31 may be exchanged with that of the second light source device 32. In this way, the visible light L generated by the first light source device 31 and the infrared light IR generated by the second light source device 32 can still be outputted to the image-forming system 4 to generate and project the visible light image and the infrared light image.

Figure 5:
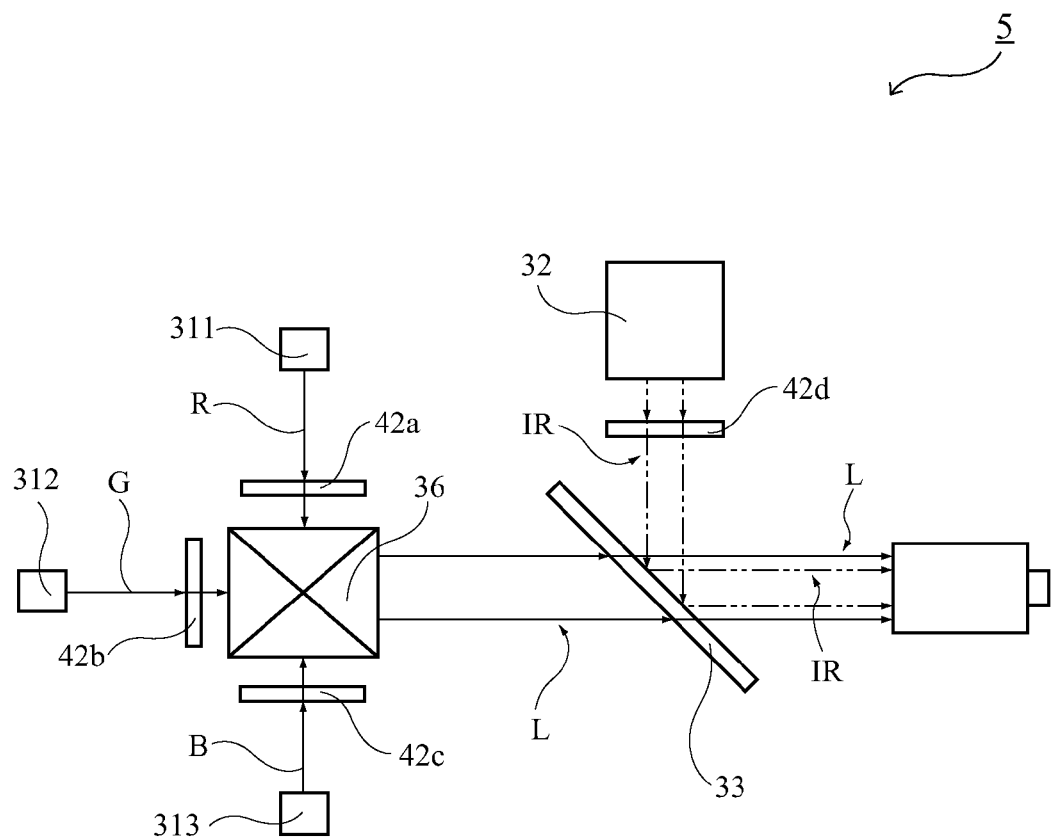
FIG. 5 is a schematic view of the third embodiment of the present invention.

The third embodiment of the present invention is shown in FIG. 5. Different from the aforesaid embodiments, in the third embodiment of the present invention, the image-forming system comprises four light processing elements 42a, 42b, 42c, 42d and a second light guiding device 36. The visible light generated by the first light source device is divided into the red light R, the green light G and the blue light B. In this embodiment, the first light source device may comprise a red light source 311 generating the red light R, a green light source 312 generating the green light G and a blue light source 313 generating the blue light B to generate the red light R, the green light G and the blue light B respectively. The red light R, the green light G, and the blue light B generated by the first light source device and the infrared light IR generated by the second light source device 32 are correspondingly outputted to the four light processing elements 42a, 42b, 42c, 42d respectively to make the red light R form the red light image, make the green light G form the green light image, make the blue light B form the blue light image and make the infrared light IR form the infrared light image respectively.

In reference to FIG. 5, the second light guiding device 36 of the illumination system 3 selectively guides the red light image, the green light image and the blue light image so that the red light image, the green light image and the blue light image are combined into a visible light image for output to the first light guiding device 33.

The first light guiding device 33 guides the visible light image and the infrared light image to the image-forming system and projects them outward. In this embodiment, due to the characteristics of the dichroic layer of the first light guiding device 33, the visible light image will pass through the first light guiding device 33 to enter the image-forming system, and the infrared light image will be reflected by the first light guiding device 33 into the image-forming system.

Preferably, in this embodiment, the red light source 311, the green light source 312 and the blue light source 313 come from a red light emitting diode that generates the red light R, a green light emitting diode that generates the green light G and a blue light emitting diode that generates the blue light B respectively. Alternatively, the red light source 311, the green light source 312 and the blue light source 313 of the first light source device are a red laser light source, a green laser light source and a blue laser light source respectively. Further, as described above, the light emitting diodes and the laser light sources may be used in combination; and the green light source 312 may also be obtained through the excitation of a green phosphor by the blue laser light source or the blue light emitting diode. Furthermore, the second light guiding device 36 is preferably selected from a group consisting of an X-cube and an X-plate to selectively guide and combine the red light image, the green light image and the blue light image to form the visible light image.

It can also be readily inferred by those of ordinary skill in the art that the first light guiding device 33 of the third embodiment may have a dichroic layer with opposite characteristics and that the positions of the first light source device (the red light source 311, the green light source 312 and the blue light source 313 as shown in FIG. 5) together with the corresponding light processing elements 42a, 42b, 42c as well as the second light guiding device 36 may be exchanged with the positions of the second light source device 32 together with the corresponding light processing element 42d. In this way, the first light guiding device 33 can also reflect the visible light L generated by the first light source device to the image-forming system, and allow the infrared light IR generated by the second light source device 32 to pass therethrough to the image-forming system, thereby generating and projecting the visible light image and the infrared light image.

In the third embodiment, the first light source device may also not comprise the red light source 311, the green light source 312 and the blue light source 313 that generate the red light R, the green light G and the blue light B respectively, but only comprise a light source generating a white light. In this case, by means of corresponding filters, the white light generated by the first light source device is filtered into the red light R, the green light G and the blue light B respectively, which are then guided by optical elements to the corresponding light processing elements 42a, 42b, 42c respectively.

According to the above descriptions, the present invention provides an illumination system for a projection device, which can generate a visible light image and an infrared light image. In the present invention, the infrared light image is generated by processing a substantially pure infrared light that is directly generated by a light source. Unlike other conventional night vision simulation systems, the illumination system of the present invention can generate both an infrared light image and a visible light image in the same apparatus without the need of complicated parts and apparatuses and without the need of an infrared light filter for filtering and generating the infrared light. Thereby, problems such as a significant decrease in the luminance of the infrared light image and generation of massive heat energy in the infrared light filter due to absorption of massive light energy that is filtered out are avoided.

The above disclosure is related to the detailed technical contents and inventive features thereof. People skilled in this field may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:

1. An illumination system for a projection device, the projection device having an image-forming system, the illumination system comprising:
    a first light source device generating a visible light;
    a second light source device directly generating a substantially pure infrared light;
    a first light guiding device guiding the visible light and the infrared light; and
    a switch device disposed between the first light source device and the first light guiding device to control the visible light entering the first light guiding device;
    wherein the illumination system outputs the visible light and the infrared light to the image-forming system for processing to make the visible light form a visible light image and make the infrared light form an infrared light image.

2. The illumination system as claimed in claim 1, wherein the second light source device comprises an infrared light emitting diode or an infrared laser light source.

3. The illumination system as claimed in claim 1, wherein the image-forming system of the projection device further comprises a light processing element, and the first light guiding device guides and outputs the visible light and the infrared light to the light processing element to make the visible light form the visible light image and make the infrared light form the infrared light image.

4. The illumination system as claimed in claim 3, wherein the first light source device is a white light source, the illumination system further comprises a color wheel disposed between the first light guiding device and the image-forming system, and the color wheel comprising a red sector, a green sector, a blue sector, and a transparent sector filters the visible light into a red light, a green light, and a blue light respectively by time sequence control and allows the infrared light to pass through the transparent sector.

5. The illumination system as claimed in claim 4, wherein the first light source device is a high intensity discharge (HID) lamp or an ultra high pressure (UHP) lamp.

6. The illumination system as claimed in claim 4, wherein the first light source device comprises a white light emitting diode.

7. The illumination system as claimed in claim 3, wherein the first light source device comprises a red light emitting diode, a green light emitting diode and a blue light emitting diode emitting a red light, a green light, and a blue light respectively by time sequence control.

8. The illumination system as claimed in claim 3, wherein the first light source device comprises a red laser light source, a green laser light source, and a blue laser light source emitting a red light, a green light, and a blue light respectively by time sequence control.

9. The illumination system as claimed in claim 3, wherein the light processing element is a liquid crystal display (LCD) element, a digital micromirror device (DMD), or a liquid crystal on silicon (LCOS) element.

10. The illumination system as claimed in claim 1, wherein the first light guiding device comprises a dichroic layer allowing the visible light to pass therethrough and reflecting the infrared light to the image-forming system.

11. A projection device comprising:
    an illumination system comprising:
        a first light source device generating a visible light;
        a second light source device directly generating a substantially pure infrared light;
        a first light guiding device guiding the visible light and the infrared light; and
        a switch device disposed between the first light source device and the first light guiding device to control the visible light entering the first light guiding device; and
    an image-forming system receiving the visible light and the infrared light, wherein the image-forming system receives the visible light and the infrared light guided from the first light guiding device so as to make the visible light form a visible light image and make the infrared light form an infrared light image.

12. The projection device as claimed in claim 11, wherein the second light source device comprises an infrared light emitting diode or an infrared laser light source.

13. The projection device as claimed in claim 11, wherein the image-forming system of the projection device further comprises a light processing element, and the first light guiding device guides and outputs the visible light and the infrared light to the light processing element to make the visible light form the visible light image and make the infrared light form the infrared light image.

14. The projection device as claimed in claim 13, wherein the first light source device is a white light source, the illumination system further comprises a color wheel disposed between the first light guiding device and the image-forming system, and the color wheel comprising a red sector, a green sector, a blue sector, and a transparent sector filters the visible light into a red light, a green light, and a blue light respectively by time sequence control and allows the infrared light to pass through the transparent sector.

15. The projection device as claimed in claim 13, wherein the first light source device comprises a red light emitting diode, a green light emitting diode, and a blue light emitting diode emitting a red light, a green light, and a blue light respectively by time sequence control.

16. The projection device as claimed in claim 13, wherein the first light source device comprises a red laser light source, a green laser light source, and a blue laser light source emitting a red light, a green light, and a blue light respectively by time sequence control.

* * * * *